(12) United States Patent
Fu et al.

(10) Patent No.: US 12,686,051 B2
(45) Date of Patent: Jul. 21, 2026

(54) FORMING PART WITH A CANTILEVER STRUCTURE AND ITS FORMING METHOD

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Jun Fu, Shanghai (CN); Liming Lei, Shanghai (CN); Xin Fu, Shanghai (CN); Xinmin Zhou, Shanghai (CN); Xue Yan, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 596 days.

(21) Appl. No.: 18/028,049

(22) PCT Filed: Oct. 21, 2021

(86) PCT No.: PCT/CN2021/125363
§ 371 (c)(1),
(2) Date: Mar. 23, 2023

(87) PCT Pub. No.: WO2022/100397
PCT Pub. Date: May 19, 2022

(65) Prior Publication Data
US 2023/0339022 A1     Oct. 26, 2023

(30) Foreign Application Priority Data
Nov. 11, 2020     (CN) ......................... 202011251884.X

(51) Int. Cl.
B22F 5/00     (2006.01)
B33Y 10/00     (2015.01)
B33Y 80/00     (2015.01)

(52) U.S. Cl.
CPC ................ B22F 5/00 (2013.01); B33Y 10/00 (2014.12); B33Y 80/00 (2014.12)

(58) Field of Classification Search
CPC .................................. B22F 5/00; B33Y 10/00
See application file for complete search history.

(56) References Cited

U.S. PATENT DOCUMENTS

| | | | |
|---|---|---|---|
| 6,505,089 | B1 | 1/2003 | Yang et al. |
| 2005/0133527 | A1 | 6/2005 | Dullea et al. |

(Continued)

FOREIGN PATENT DOCUMENTS

| | | |
|---|---|---|
| CN | 104289712 A | 1/2015 |
| CN | 106041075 A | 10/2016 |

(Continued)

OTHER PUBLICATIONS

International Search Report issued on Jan. 27, 2022, in corresponding International Patent Application No. PCT/CN2021/125363, 6 pages.

(Continued)

*Primary Examiner* — Larry W Thrower
(74) *Attorney, Agent, or Firm* — Maier & Maier, PLLC

(57) ABSTRACT

A forming method and a forming part with a cantilever structure. The forming method includes: obtaining a model of the part to be formed, adding an inclined supporting portion to the cantilever structure, performing layer separating and slicing process on the model, performing scanning path planning on each forming layer. A suspended area and a non-suspended area are provided in a plurality of forming layers forming the inclined surface, frame scanning (Continued)

path includes a first path and a second path, the first path corresponds to the non-suspended area and the second path corresponds to the suspended area. Based on the size of the angle of inclination, setting process parameters for preparation for the first path and the second path, and printing layer by layer based on the set process parameters for preparation.

10 Claims, 7 Drawing Sheets

(56) References Cited

U.S. PATENT DOCUMENTS

2014/0303942 A1* 10/2014 Wighton ............. B29C 33/3842
                                                        703/1
2018/0141123 A1*  5/2018 Revanur ................ B33Y 50/00

FOREIGN PATENT DOCUMENTS

| CN | 106424723 | A  | 2/2017 |
| CN | 106041075 | B  | 3/2018 |
| CN | 107876769 | A  | 4/2018 |
| CN | 110696366 | A  | 1/2020 |
| CN | 112059185 | A  | 12/2020 |
| EP | 3756860   | A1 | 12/2020 |
| EP | 4282574   | A1 | 11/2023 |
| JP | 2017128770 | A | 7/2017 |
| WO | 2022146647 | A1 | 7/2022 |

OTHER PUBLICATIONS

Extended European Search Report issued on Sep. 26, 2024, in corresponding European Application No. 21890924.0, 9 pages.
Sreeramagiri et al., "Comparison of Laser Deposition Methods for the Synthesis of AlxCoCrFeni Multi-Principal Element Alloy", Journal of Materials Research and Technology, The Author(s), Elsevier B.V., vol. 19, May 21, 2022, pp. 1090-1101.

* cited by examiner

1

FORMING PART WITH A CANTILEVER STRUCTURE AND ITS FORMING METHOD

TECHNICAL FIELD

The disclosure relates to additive manufacturing technique, in particular to a forming part with a cantilever structure and its forming method.

BACKGROUND

As a novel manufacturing technique, additive manufacturing technique has developed rapidly in recent years, and laser melting deposition technique is a kind of additive manufacturing technique with advanced direct energy deposition which is developed based on rapid prototyping, compared with the traditional forging-machining forming technique, comprising the following process characteristics: (1) high utilization rate of material, small amount of machining; (2) fewer procedures in the production process, simple process, high flexibility and the ability of rapid response; (3) molds not required for the forming process, low manufacturing cost, short production cycle, which can greatly satisfy the low-cost manufacturing of metal materials with high melting point, difficulty in processing and high price, and is widely used in the fields of aerospace, automobile, shipping, etc.

Based on the technical principle of discrete-stacking of additive manufacturing, the parts can be stacked layer by layer and finally formed, which limits the further application of additive manufacturing technique on complex parts, such as parts with a cantilever structure or a suspension girder structure.

The cantilever structure or suspension girder structure refers to a structure feature that is substantially perpendicular to a deposition direction of laser melting deposition of the part and the lower portion is in a suspended state. For the laser melting deposition techniques with coaxial powder/wire feeding, the part is formed by stacking layer by layer, and for the part with cantilever structure, the lower portion of the cantilever structure of the part is not supported by powder or solid structure, so it cannot be formed directly by its own characteristic of layer-by-layer stacking.

At present, the method for forming the cantilever structure or the suspension girder structure in the prior art is to form the cantilever structure by changing the deposition direction. Since the structure formed by additive manufacturing with laser melting deposition is generally a columnar crystal growing epitaxially along the deposition direction, changing the deposition direction will change the structure feature at that position, thereby affecting the performance of the part. In addition, changing the deposition direction requires machining on the surface of the position before forming to prevent surface oxidation, surface roughness, near-surface feature structure, etc. from affecting the forming quality of the interface position. At the meantime, machining on the part surface needs to be performed on a machining equipment, and generally, the laser melting deposition equipment does not have the function of machining, so the procedures of picking, clamping, positioning, etc. of the part on different equipment will increase the processing and manufacturing time of the part and increase the cost.

Without changing the deposition position, and performing laser melting deposition based on the original placing position, support needs to be added under the cantilever structure to ensure the formation of the part, and generally the support added is a solid support. However, according to the characteristics of the layer-by-layer forming process of laser melting deposition, only supports with a small inclination angle can be formed, and the angle of inclination to the deposition direction generally does not exceed 30°, and in order to ensure the forming quality, the angle of inclination of the forming support to the deposition direction does not exceed 20°. The support with a relatively small angle of inclination will still increase the processing and manufacturing time of the part and increase the cost of forming materials, meanwhile, the support formed also need to be removed subsequently by machining or other methods, which will also lead to a large waste of materials and increase in process time and cost of the part.

SUMMARY

One objective of the disclosure is to provide a forming method, which can solve the problem that a forming part with a cantilever structure needs too much support during the forming process.

The other objective of the disclosure is to provide a forming part with a cantilever structure, which is formed by the above forming method.

In order to achieve the objective mentioned above, the method for forming the forming part with the cantilever structure, used for forming the forming part with the cantilever structure, the cantilever structure is perpendicular to the laser melting deposition direction of the forming part and a lower portion is in a suspended state;

wherein the forming method comprises:

obtaining a model of the part to be formed, the model has at least one cantilever structure;

adding at least one inclined supporting portion to the cantilever structure, the lower portion of the cantilever structure in the suspended state is supported by the inclined supporting portion, the inclined supporting portion is provided with at least one inclined surface, the inclined surface is provided with an angle of inclination, the angle of inclination is an acute angle between the inclined surface and a forming base plate;

performing layer separating and slicing process on the model along a direction perpendicular to a deposition direction, forming a plurality of forming layers;

performing scanning path planning on each forming layer, the scanning path after planning comprises an inner filling scanning path and a frame scanning path located on an outer periphery of the inner filling scanning path;

wherein in a plurality of forming layers forming the inclined surface, at least one layer to be formed has a suspended area protruding from a layer already formed and a non-suspended aera, the frame scanning path comprises a first path and a second path, the first path corresponds to the non-suspended area and the second path corresponds to the suspended area;

based on the size of the angle of inclination, setting first process parameters for preparation for the first path, and setting second process parameters for preparation for the second path;

using laser melting deposition technique, printing layer by layer based on the set process parameters for preparation to form the forming part with the cantilever structure;

wherein an energy density in the first process parameters for preparation is smaller than an energy density in the second process parameters for preparation.

3

In One or More Embodiment, the Forming Method Further Comprises:

setting third process parameters for preparation for the inner filling scanning path; wherein an energy density in the third process parameters for preparation is smaller than the energy density in the first process parameters for preparation.

In one or more embodiment, the different energy density is obtained by adjusting laser power and/or scanning rate in the process parameters for preparation.

In One or More Embodiment, Wherein the Forming Method Further Comprises:

performing support removing processing on the forming part to obtain the forming part with the cantilever structure.

In one or more embodiment, the first path and the second path are printed continuously during the forming process.

In one or more embodiment, a 90° angle is provided between the inner filling scanning path in two adjacent forming layers.

In One or More Embodiment, the Scanning Path Planning Further Comprises:

planning an extending path of the second path that extends along the first path;

planning a displacement between the second path and the inner filling scanning path; wherein the second process parameters for preparation are set for the extending path.

In One or More Embodiment, the Scanning Path Planning Further Comprises:

planning an offset displacement of the second path towards the inner filling scanning path.

In one or more embodiment, before performing the layer separating and slicing process on the model, the forming method further comprises:

performing allowance addition processing on the model.

In order to achieve the other objective mentioned above, a forming part with an cantilever structure is formed by the above methods for forming the forming part with the cantilever structure.

The improvements of the disclosure comprise at least the followings:

The forming method can ensure that the inclined supporting portion with a larger angle of inclination can be formed, as the angle of inclination of the inclined supporting portion increases, the suspended portion of the cantilever structure that can be supported by the inclined supporting portion can be longer. Therefore for the same cantilever structure, the number of supporting structures and the material consumed by the same supporting structure can be reduced by the present method, thereby reducing the time spent on removing the supports and the waste of material.

BRIEF DESCRIPTIONS OF THE DRAWINGS

The specific features and performance of the disclosure are further described with reference to the following embodiments and accompanying drawings.

FIG. 1 schematically shows a schematic diagram of the forming part with the cantilever structure formed by the forming method according to an embodiment.

4

Figure 4:
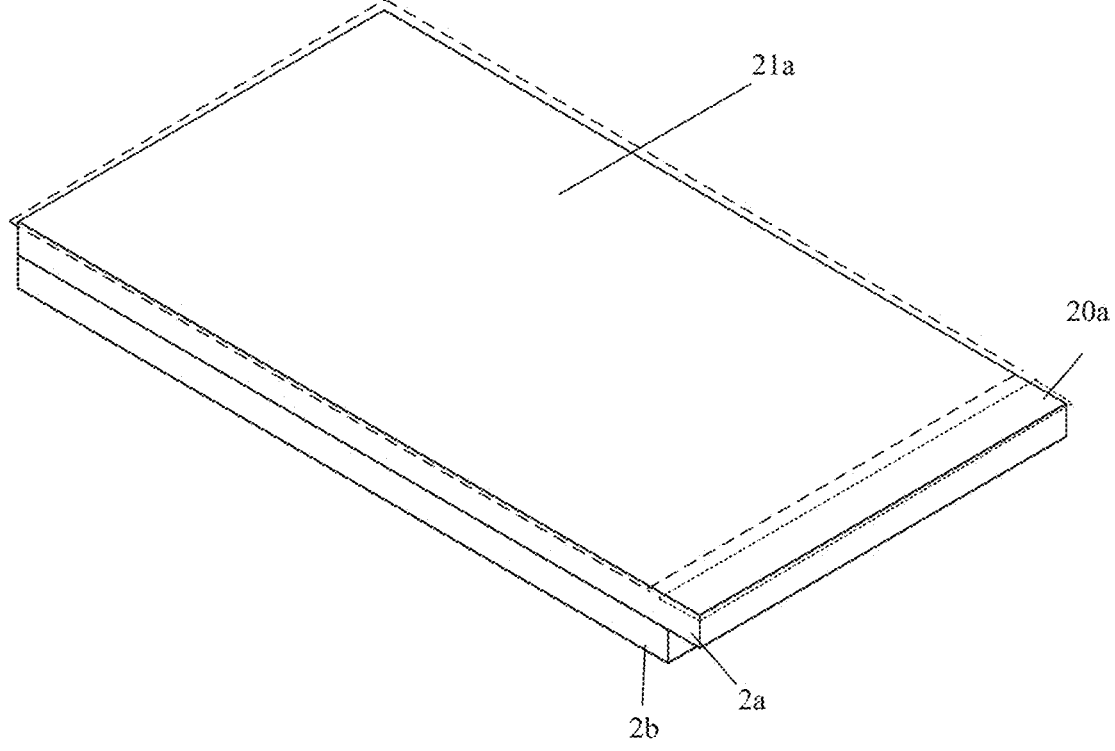

FIG. 4 shows a schematic diagram of the forming layer that forms the inclined surface of the inclined supporting portion of the part according to an embodiment.

Figure 5:
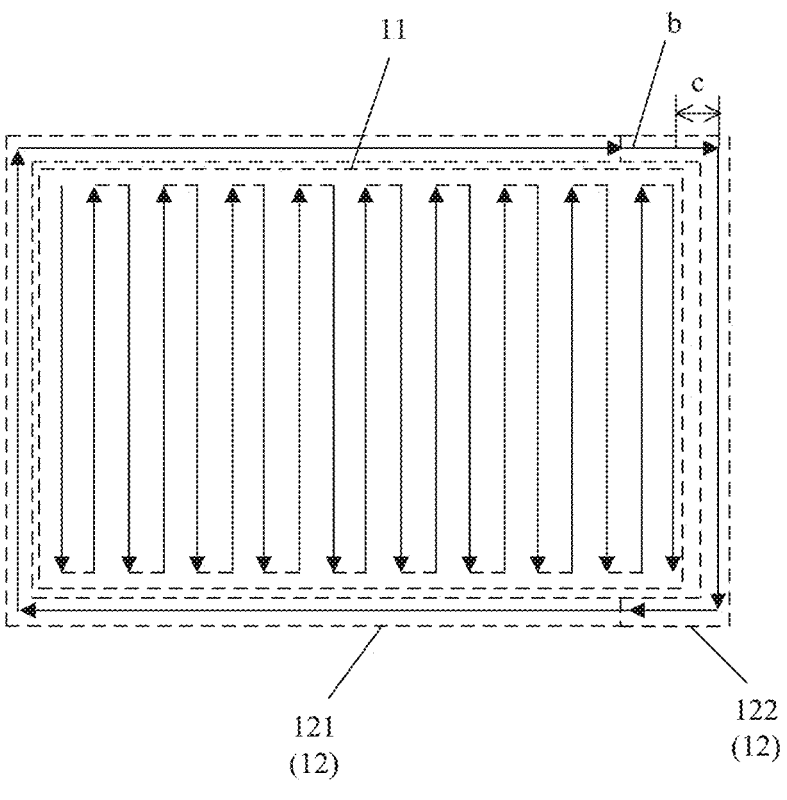

FIG. 5 shows a schematic diagram of the forming layer that forms the inclined surface of the inclined supporting portion after path planning according to an embodiment.

Figure 6:
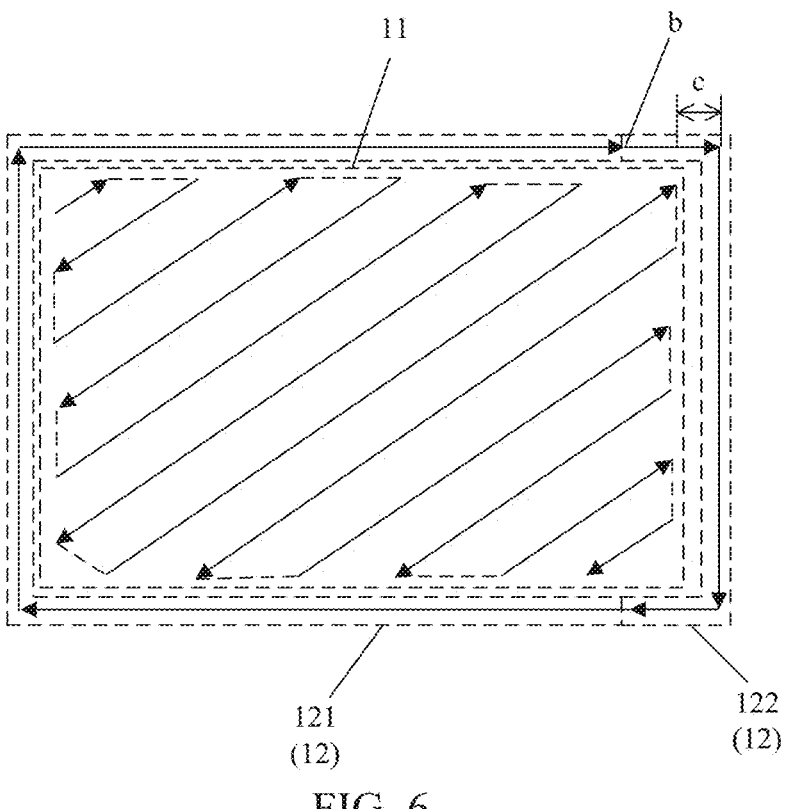

FIG. 6 shows a schematic diagram of the forming layer that forms the inclined surface of the inclined supporting portion after path planning according to another embodiment.

Figure 7:
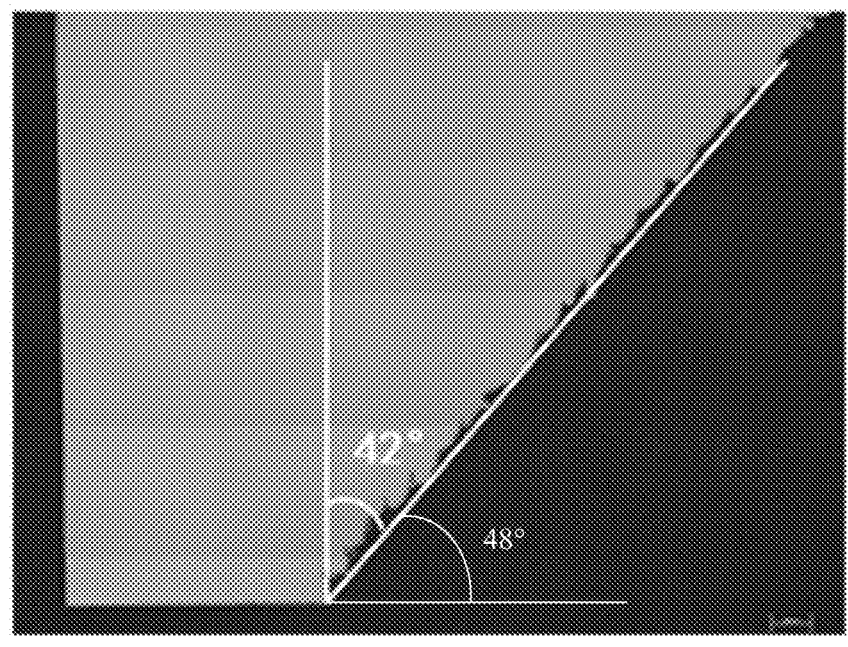

FIG. 7 shows a cross section view of the inclined supporting portion formed by laser melting deposition according to the first embodiment of the disclosure.

Figure 8:
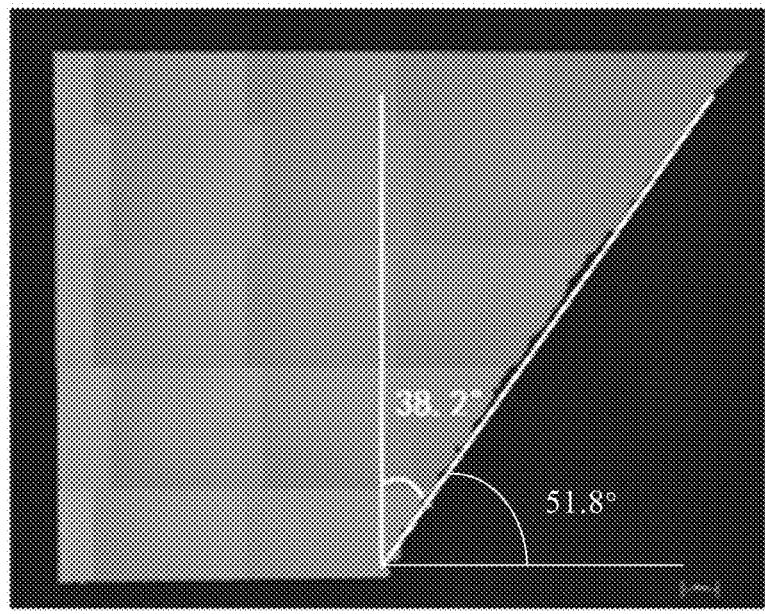

FIG. 8 shows a cross section view of the inclined supporting portion formed by laser melting deposition according to the second embodiment of the disclosure.

Figure 9:
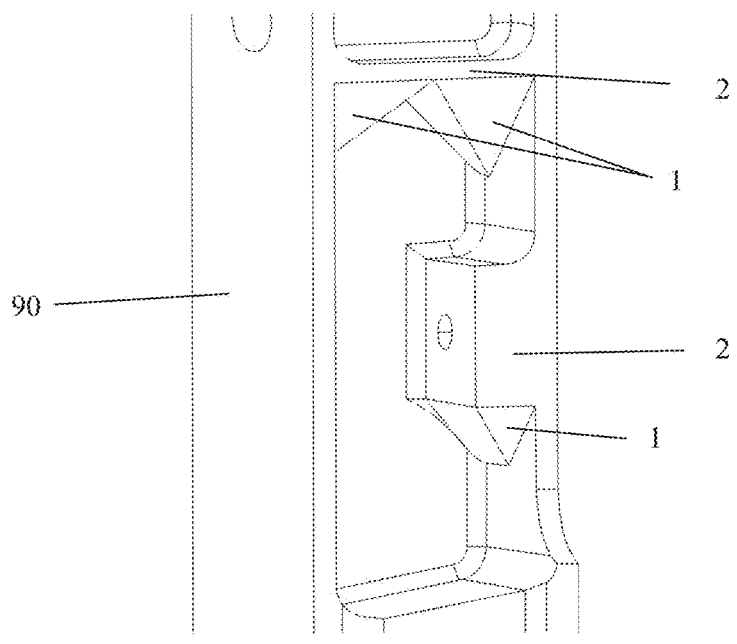

FIG. 9 shows a partial schematic diagram of the part formed according to one or more embodiments of the disclosure.

Figure 10:
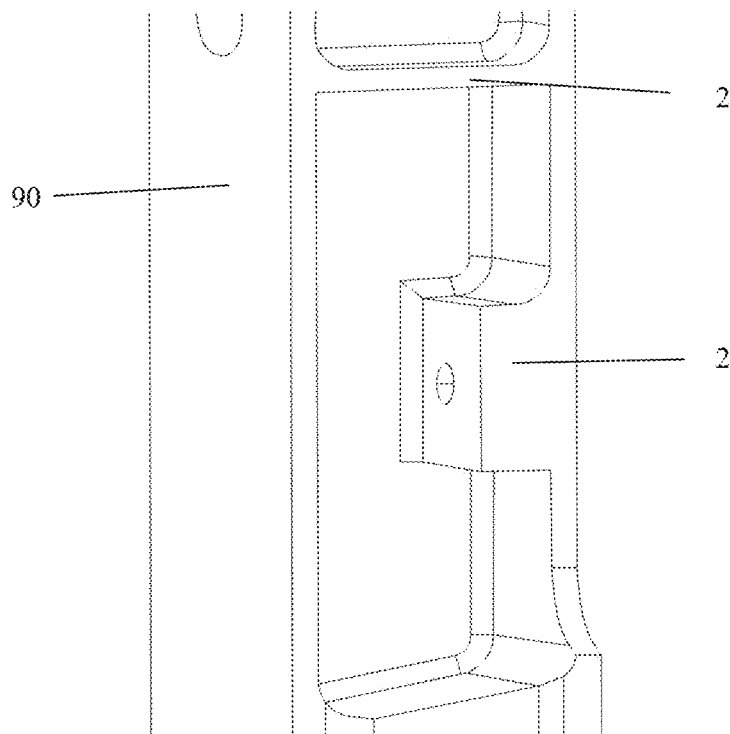

FIG. 10 is a schematic diagram of the part shown in FIG. 9 after the inclined supporting portion 1 is removed by the support removing method of machining

DETAILED DESCRIPTION

In this disclosure, specific terms are used for describing the embodiments of the disclosure, such as 'one embodiment', 'an embodiment' and/or 'some embodiments' refers to a certain feature, structure or characteristics related to at least one embodiment of the disclosure. Therefore, it should be emphasized and noted that 'one embodiment' or 'an embodiment' mentioned two or more times in various places in the description do not necessarily refer to the same embodiment. Furthermore, certain features, structures or characteristics in one or more embodiments of the disclosure can be combined as appropriate. In addition, the use of terms such as 'first' and 'second' for defining components is only for the convenience of distinguishing the corresponding components, unless otherwise stated, the above terms do not have special meaning, and therefore cannot be considered as limitations on the scope of protection of the disclosure.

Figure 1:
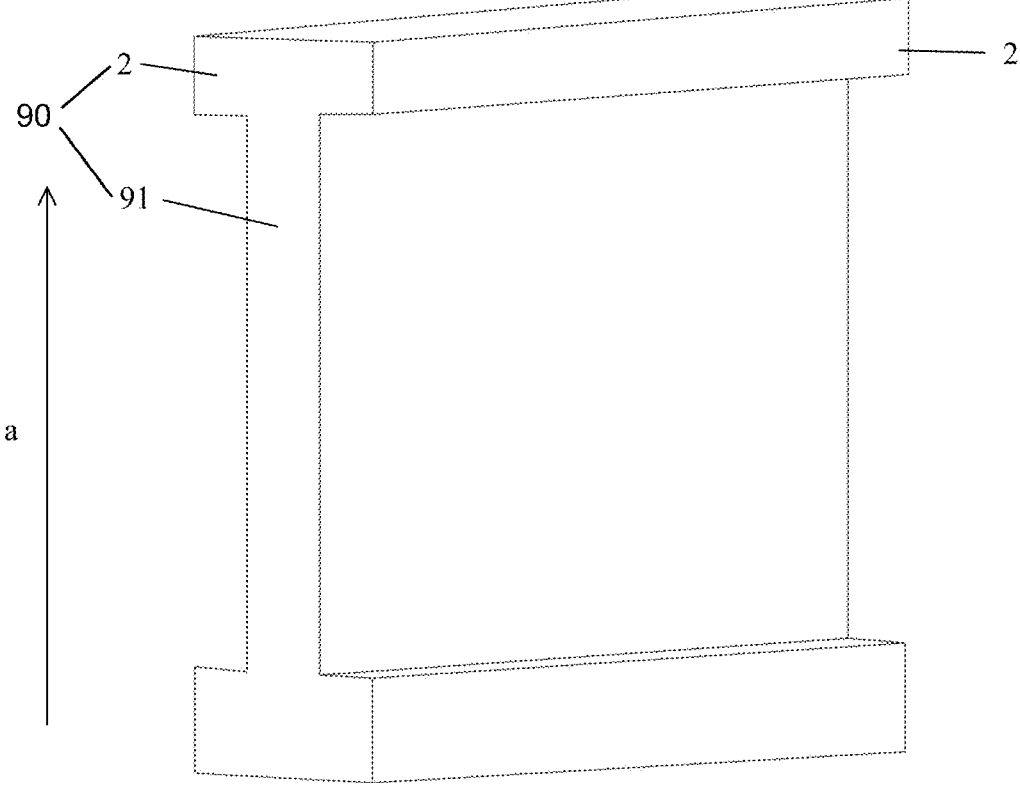
Figure 2:
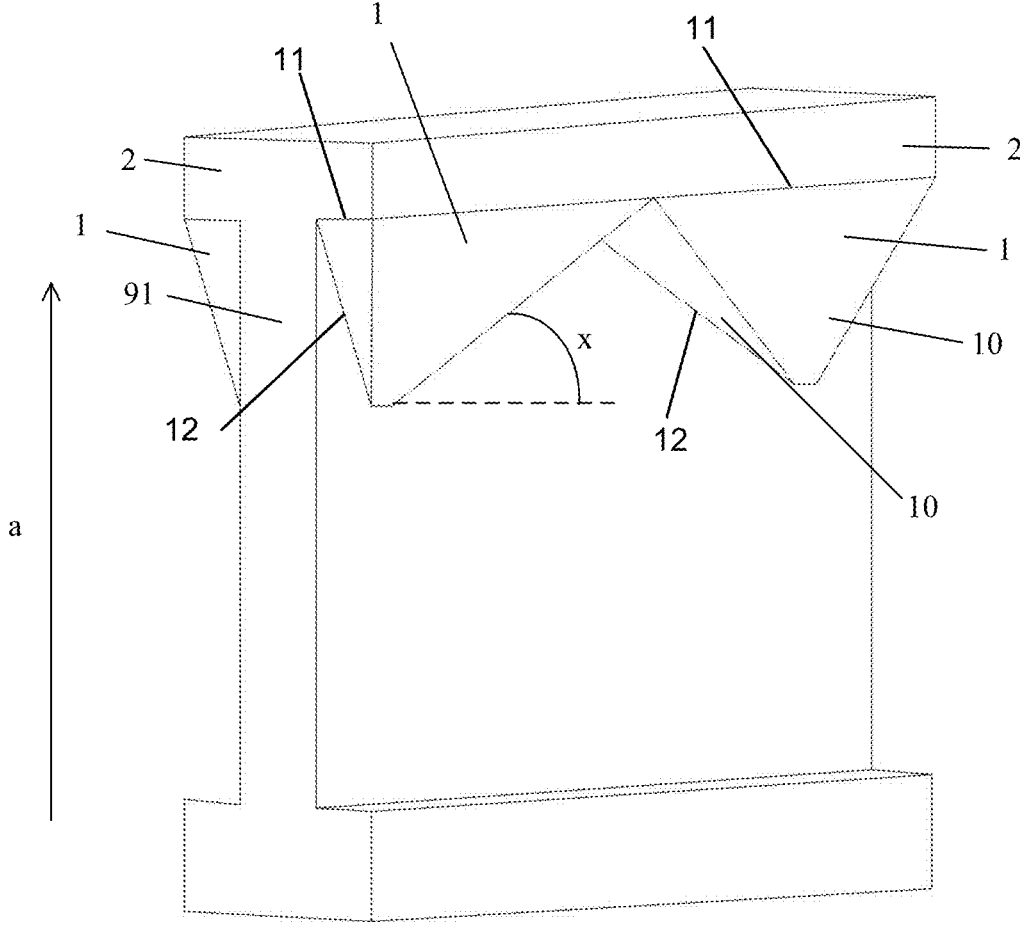
FIG. 2 is a schematic diagram of the forming part with the cantilever structure shown in FIG. 1 with a support added according to an embodiment.

One aspect of one or more of the following embodiments is to provide a forming method, used for forming a forming part with a cantilever structure. FIG. 1 schematically shows a schematic diagram of the forming part with the cantilever structure formed by the forming method according to an embodiment. FIG. 2 is a schematic diagram of the forming part with the cantilever structure shown in FIG. 1 with a support added according to an embodiment.

The forming part 90 is formed by deposition of additive manufacturing process, with a deposition direction a. In the additive manufacturing forming process, the forming part is generally placed on a surface of a forming base plate for forming, so the deposition direction a of forming is generally perpendicular to the forming base plate. The forming part 90 is provided with the cantilever structure 2, the cantilever structure 2 is perpendicular to the laser melting deposition direction a of the forming part and the lower portion is in a suspended state. It can be understood that the cantilever structure 2 being perpendicular to the deposition direction a in the disclosure does not necessarily refer to an absolutely vertical states, which means that on the basis of the cantilever structure 2 being substantially perpendicular to the deposition direction a, an allowable angle error may exist, such as an angle error of less than 1°.

In the process of additive manufacturing, the powder melted by laser energy is represented as liquid droplets that accommodating in a molten pool of a base material, and a body of the forming part will be formed when the molten pool is cooled for solidification. Since the lower portion of the cantilever structure 2 is in the suspended state during the forming process, a partial area of the lower portion of the molten pool that is not solidified is in the suspended state, the area will tend to fall and collapse toward the forming base plate due to the action of gravity, resulting in a poor forming quality due to the collapse between the actual forming part and the design model. Therefore, an inclined supporting portion 1 need to be added to the cantilever structure 2 as shown in FIG. 2.

The inclined supporting portion 1 is provided with an inclined surface 10, the inclined surface 10 is a surface which is oriented downward and at an angle x to the forming base plate, wherein the inclined surface 10 can be a flat surface as shown in the figure, or be a curved surface different from the figure. In the schematic diagram of the forming part shown in FIG. 1, the angle x is marked as the angle between the inclined surface 10 and a plane perpendicular to the deposition direction, wherein the size of the angle x ranges from 0° to 90°, that is, the angle between the inclined surface 10 and forming base plate is an acute angle.

For the inclined supporting portion 1 with the inclined surface 10, as the angle between the inclined surface 10 and forming base plate is an acute angle, it is also likely that the molten pool that is not solidified and is in the suspended state tends to fall and collapse toward the forming base plate due to the action of gravity during the actual forming process, and with the decrease in the angle x, there will be more suspended area of the molten pool, the tendency of collapse due to the action of gravity will be more significant. Currently, when directly forming the part with the inclined surface, it is difficult to form a part with the angle x of less than 60°, additional auxiliary supports need to be added during the forming process.

Based on the forming technique in the prior art, the disclosure solves the problem that the forming part with the cantilever structure needs too much support during the forming process.

Figure 3:
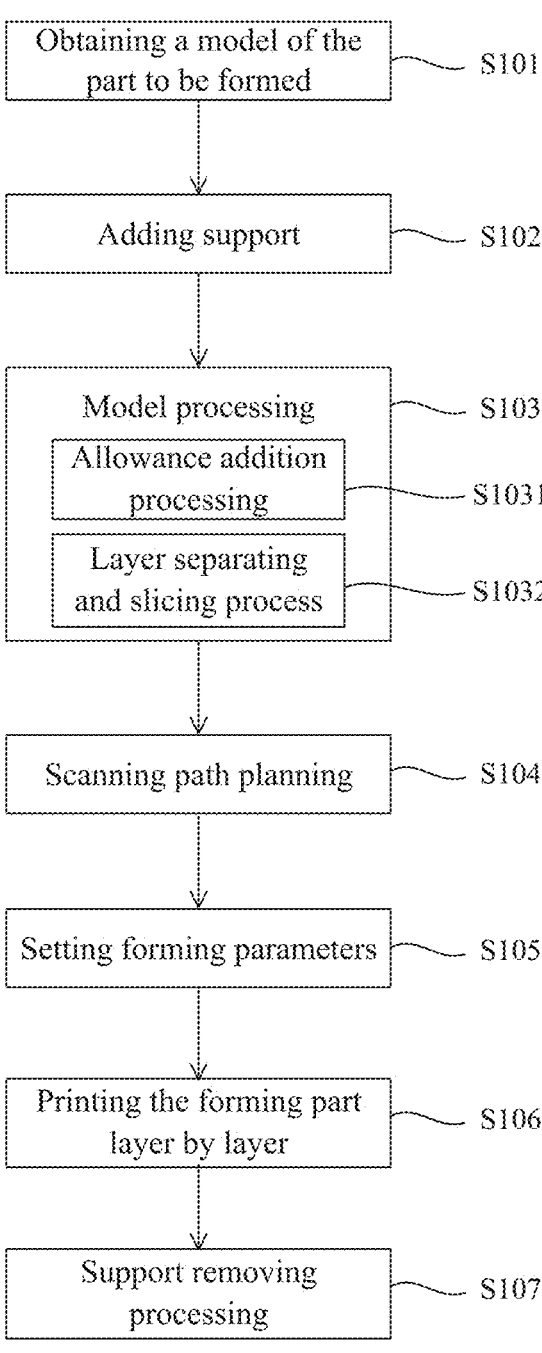
FIG. 3 is a schematic flow diagram of an embodiment of the forming method.

FIG. 3 is a schematic flow diagram of an embodiment of the forming method, which can reduce the number of supports used during forming process of the part with the cantilever structure without affecting the forming quality of the part with the cantilever structure, the forming method comprises:

Step S101: Obtaining a model of the part to be formed, the model of the part can be the model of the forming part 90 schematically shown in FIG. 1, which has main body 91 and two cantilever structures 2 protrude from the main body 91 or extending towards two sides, or can be a model of a forming part provided with one or more cantilever structure difference from the one shown in the figure.

Step S102: adding support, specifically, adding the inclined supporting portion 1 to the model. The top 11 of the inclined supporting portion 1 is integrally connected to the cantilever structure 2, a side 12 is integrally connected to the main body 91, and so that the lower portion of the cantilever structure 2 in the suspended state is entirely supported by the at least one inclined supporting portion 1. The model after adding the inclined supporting portion 1 is shown in FIG. 2, wherein the number of the inclined supporting portion 1 can be as shown in FIG. 2, each cantilever structure 2 is added by two inclined supporting portion 1, the top 11 is covered because it is a joint surface of cantilever structure 2 and inclined supporting portion 1, and the side 12 is also covered because it is a joint surface of main body 91 and inclined supporting portion 1. Being different from the number shown in the figure, the number of the inclined supporting portion 1 can also be one or more. Each inclined supporting portion 1 can be provided with three inclined surfaces 10 as shown in the figure, or the specific structure of the inclined supporting portion 1 can also comprise some other suitable modifications or alternatives compared with the one shown in the figure, for example, the number of the inclined surface 10 can be one, two or other multiple number.

It can be understood that in the step of adding support in the step S102, the three-dimensional model of the part to be formed is placed and modeled in a three-dimensional space according to a predetermined forming direction of the part by using a three-dimensional modeling software, where the model processing software can be three-dimensional modeling software such as UG and CAD. When building the model of the forming part by the three-dimensional modeling software, the cantilever structure of the forming part and the size of the cantilever structure can be obtained and identified, on the basis of ensuring the formation of the support and the part, a position, number of the inclined support and an angle of inclination of each inclined surface can be designed based on the principle of minimum volume of the inclined support. Preferably, the size of the angle of inclination of each inclined surface 10 is larger than or equal to 45°. In a preferred embodiment, the angle of inclination of the inclined surface 10 of the inclined supporting portion 1 is 45°.

Step S103: model processing, which comprises step S1032: layer separating and slicing process. Specifically, the horizontal layer separating and slicing process is performed on the model of the part obtained by modelling in the three-dimensional modeling software, forming a plurality of forming layers, and each forming layer after cutting is perpendicular to the deposition direction a, wherein each forming layer is a layer deposited and stacked during the additive manufacturing process.

Step S104: scanning path planning. FIG. 4 shows a schematic diagram of the forming layer that forms the inclined surface 10 of the part, FIG. 5 shows a schematic diagram of the forming layer that forms the inclined surface of the part after path planning. The scanning path is a moving path of a laser spot during the additive manufacturing process. Specifically, after the layer separating and slicing process of the part model is completed, scanning path planning is performed on each forming layer of the model, each forming layer after planning comprises an inner filling scanning path 11 and a frame scanning path 12 located on the outer periphery of the inner filling scanning path 11. As shown in FIG. 3, among a plurality of forming layers forming the inclined surface 10 of the part, at least one layer to be formed 2a has a suspended area 20a protruding from the layer already formed 2b and a non-suspended area 21a as shown in FIG. 3. Referring to FIG. 3 and FIG. 4 in combination, the frame scanning path 12 comprises a first path 121 and a second path 122, and in the frame scanning path 12, the first path 121 corresponds to the non-suspended area 21a and the second path 122 corresponds to the suspended area 20a. It can be understood that the frame scanning path 12 is the forming path for forming an outer contour of a product, and the inner filling scanning path 11 is the forming path of the product after removing the frame scanning path 12.

FIG. 5 schematically shows the relationship of relative position between the inner filling scanning path 11, the first path 121 and the second path 122 of the frame scanning path 12, which is not intended to limit the specific scope.

The positional relationship between the inner filling scanning path 11 and the frame scanning path 12 are further described in the following content. Referring to FIG. 4 and FIG. 5 in combination, when a radius of the laser spot formed along the second path 122 is smaller than a width of the suspended area 20a during the forming process, only the part of frame scanning path 12 in the suspended area 20a is included in the second path 122, while the corresponding part of inner filling scanning path 11 in the suspended area 20a is not included, in this embodiment, a relatively small angle of inclination x of the part can be formed for the same spot size. When the radius of the laser spot formed along the second path 122 is larger than a width of an area that is suspended and protruding from the layer already formed, at least part of the forming area of the second path 122 is the suspended area 20a, and a part overlaps with the laser spot along the scanning path 11 during forming, in this embodiment, a relatively large angle of inclination x of the part can be formed for the same spot size.

Step S105: setting forming parameters. Specifically, based on the size of the angle of inclination x of the part to be formed, first process parameters for preparation are set for the first path 121, and second process parameters for preparation are set for the second path 122, wherein the energy density in the first process parameters for preparation is smaller than the energy density in the second process parameters for preparation.

The process parameters for preparation comprise one or more parameters of laser power, scanning rate, powder feeding rate, spot diameter, scanning spacing and layer thickness. In an embodiment, the process parameters for preparation of the angle of inclination of the forming part is obtained by adjusting one or more parameters of the process parameters for preparation, comparing a variation relationship between a forming specimen and the parameters and the trial and error method. In another embodiment, a relationship between the angle of inclination of the part and the adjustment of one or more parameters of the process parameters for preparation can also be obtained by summarizing, so the process parameters for preparation of the angle of inclination of the forming part is obtained.

Step S106: printing the forming part layer by layer. Specifically, printing is performed layer by layer based on the set process parameters for preparation, so the forming part 90 with the cantilever structure 2 is formed as shown in FIG. 1, wherein the laser melting deposition technique in the powder/wire feeding technique is adopted by the forming method for forming, compared with the additive manufacturing process where the molten power bed is supported by powder, when forming with the laser melting deposition technique, collapse is more likely to occur as there is no support such as powder under the suspended area of the forming part. Provided with the present forming method, when forming with the laser melting deposition technique, the occurrence of collapse during the forming process can be reduced, improving the forming accuracy of the angle of inclination, thereby improving the forming quality and the forming length of the cantilever structure.

In the forming layers forming the inclined surface of the inclined supporting portion 1 of the part, the frame scanning path 12 of the forming layer is separated into the first path 121 and the second path 122, and a relatively large energy density is used for forming the second path 122, so that during the forming process of the second path 122, the powder at this position will be subjected to the relatively large energy density and be melted and deposited to form a larger and thicker molten pool, which compensates the lack of deposition amount caused by the collapse of the molten pool at the position of the inclined structure due to the gravity acting on part of the suspended area close to the boundary, thereby ensuring sufficient deposition amount of the inclined structure and ensuring that the inclined supporting portion 1 with a larger angle of inclination x can be formed, as the angle of inclination x of the inclined supporting portion 1 increases, the suspended portion of the cantilever structure 2 that can be supported by the inclined supporting portion 1 can be longer. Therefore, for the same cantilever structure 2, the number of supporting structures and the material consumed by the same supporting structure can be reduced by the present method, thereby reducing the time spent on removing the supports and the waste of material.

In an embodiment of the forming method, setting forming parameters further comprises:

setting third process parameters for preparation for the inner filling scanning path 11, wherein the energy density in the third process parameters for preparation is smaller than the energy density in the first process parameters for preparation.

In summary, in the present forming method, the energy density in the third process parameters for preparation <the energy density in the first process parameters for preparation <the energy density in the second process parameters for preparation, that is, a relatively large energy density is used for forming the second path 122.

In an embodiment of the forming method, different energy density is obtained by adjusting the laser power and/or the scanning rate in the process parameters for preparation. Specifically, in an embodiment, different energy density is obtained by adjusting the scanning rate, in which case the scanning rate in the second process parameters for preparation <the scanning rate in the first process parameters for preparation <the scanning rate in the third process parameters for preparation. In another embodiment, different energy density is obtained by adjusting the laser power, in which case the laser power in the third process parameters for preparation <the laser power in the first process parameters for preparation <the laser power in the second process parameters for preparation.

In an embodiment of the forming method, the forming part with the inclined supporting portion 1 as shown in FIG. 2 can be obtained by step S101 to step 106 mentioned above. The forming method further comprises step S107: support removing processing, specifically, the inclined supporting portion 1 can be removed by means of machining, etc. to obtain the forming part with the cantilever structure as shown in FIG. 1.

As shown in FIG. 3, in an embodiment of the forming method, the first path 121 and the second path 122 are printed continuously during the forming process, that is, the first path 121 and the second path 122 are printed continuously, only the forming parameters are set to be different during the forming process, ensuring the continuity of the formation of the frame.

In an embodiment of the forming method, during the forming process, a 90° angle can be provided between the two adjacent layers of the inner filling scanning path 11 for reducing stress concentration during the forming process.

FIG. 6 shows a schematic diagram of the forming layer that forms the inclined surface of the inclined supporting portion 1 after path planning according to another embodiment, in this embodiment, an angle is provided between the forming path of the inner filling scanning path 11 and the forming path of the frame scanning path 12.

In an embodiment of the forming method, scanning path planning further comprises:

setting an extending path b that extends along the first path 121 of the frame scanning path 12 in the second path 122. The first path 121 is continued to the second path 122 but not overlapped, as an angle is generally provided between the first path 121 and the second path 122, direct forming will result in the collapse of the molten pool at a position of intersection of the two paths during the forming process. By planning the extending path b, sufficient forming layer thickness can be ensured at the position of intersection of the first path 121 and the second path 122, improving the ability of forming at the position of intersection of the first path 121 and the second path 122. The extending path b is generally determined based on the size of the spot diameter of laser, preferably to have the size of 0.5 to 1 spot diameter.

Wherein the size of the spot diameter is relative to the laser power and the size of powder spot diameter in the forming parameters, specifically, the spot diameter is basically consistent with the powder spot diameter, for a relatively small laser power such as smaller than 1000 W, the laser spot diameter and the powder spot diameter are generally relatively small such as about 0.5 mm; for a relatively large laser power such as larger than 2500 W, the laser spot diameter and the powder spot diameter are generally relatively large such as about 5 mm.

Setting an overlapping displacement c between the second path 122 and the inner filling scanning path 11. It can be further ensured by planning the overlapping displacement c that the molten pool of the second path 122 and the molten pool of the inner filling scanning path 11 can be overlapped effectively during the forming process, forming a compact structure, ensuring the ability of forming at the boundary position of the part, wherein the displacement c is relative to the spot diameter for forming, for a relatively large spot diameter such as larger than or equal to 5 mm, the displacement c is generally determined to be 0.8-2.5 mm; for a relatively small spot diameter such as smaller than or equal to 1 mm, the displacement c is generally determined to be 0.4-0.6 mm.

In an embodiment of the forming method, scanning path planning further comprises:

setting an offset displacement of the second path 122 towards the inner filling scanning path 11. The scanning path of the second path 122 is offset inward by a certain distance, which can reduce the inclined suspended part of the molten pool effectively and reduce the collapse during the forming process, so that the molten pool can be deposited and solidified more at the position of the inclined structure, ensuring the formation of the angle of inclination, wherein for the forming part with a relatively small angle of inclination x, the offset displacement is relatively large; for the forming part with a relatively large angle of inclination x, the offset displacement is relatively small. For example, for the forming part with an angle of inclination larger than 60°, preferably, the offset displacement is 0-0.1 mm; for the forming part with an angle of inclination smaller than 60°, preferably, the offset displacement is 0.1-1.5 mm.

In an embodiment of the forming method, the step S103: model processing further comprises step S1031: performing allowance addition processing on the model. The allowance addition processing refers to adding printing allowance to the outer periphery contour of the frame scanning path 12 of the part, so that a sufficient size allowance is provided for post processing such as machining or surface treatment after the part has been formed, ensuring the dimensional accuracy of the part formed.

In an embodiment of the forming method, different powder feeders and laser generators can be used for the inner filling scanning path 11 and the frame scanning path 12, and the printing method can be printing the frame scanning path 12 and the inner filling scanning path 11 successively or concurrently in each single layer.

The other aspect is to provide a forming part with a cantilever structure, formed by one or more forming methods mentioned above.

An inclined supporting portion with a minimum angle of inclination of 45° can be formed by the forming method provided by the disclosure, compared with the prior art where only the forming part with the angle of inclination larger than 60° can be formed, the length of the cantilever that can be supported by each inclined supporting portion can be improved significantly.

FIG. 9 shows a partial schematic diagram of the part formed according to one or more embodiments mentioned above, FIG. 10 is a schematic diagram of the part shown in FIG. 9 after the inclined supporting portion 1 is removed by the support removing method of machining, wherein the part in the figure is provided with a plurality of cantilever structures 2, during the forming process, two inclined supporting portions 1 as shown in the figure are added to each single cantilever structures 2 for formation.

The following will be further description with reference to two specific embodiments:

The First Embodiment

Firstly, a part with a cantilever structure is placed in the three-dimensional model processing software according to the predetermined forming position.

The allowance addition processing is performed on the part, where a 2 mm allowance is added to each single side. The cantilever structure of the part is identified according to the placing position, an inclined supporting portion for the cantilever structure is designed by the three-dimensional modelling UG software, the inclined surface corresponding to the inclined support is design, and the angle of inclination of the inclined surface to the plane perpendicular to the deposition direction is 48°, with a −3 mm allowance added to the angle of inclination, that is, the angle of inclination of the inclined surface of the inclined support model to the plane perpendicular to the deposition direction is 45°.

The layer separating and slicing process is performed on the part by a two-dimensional cutting software, the corresponding sides of the inclined surface in a two-dimensional cutting layer are identified, path planning are performed in each layer.

The third process parameters for preparation for the inner filling are set, comprising: laser power P=2800 W, scanning rate of the inner filling of 1000 mm/min, powder feeding rate of 20-22 g/min, spot diameter of 5 mm, layer thickness of 0.8 mm.

The first process parameters for preparation for the first path are set, comprising: laser power P=2800 W, scanning rate of the inner frame of 800 mm/min, powder feeding rate of 20-22 g/min, spot diameter of 5 mm, layer thickness of 0.8 mm.

The second process parameters for preparation for the second path are set, comprising: laser power P=2800 W, scanning rate of the outer frame of 50%*800=400 mm/min, powder feeding rate of 20-22 g/min, spot diameter of 5 mm, layer thickness of 0.8 mm.

Extending path b=3 mm, overlapping displacement c=0.8 mm are set.

The forming of the current layer is completed according to a planned forming strategy and process parameters, after the layer is formed, the next layer is inner filled by rotating 90° counterclockwise, without changing a laser scanning strategy of the scanning path of the first path 121 and the second path 122 in the frame scanning path 12, and keep repeating until the formation of the angle of inclination of the part is completed.

FIG. 7 shows a cross section view of the inclined supporting portion formed by laser melting deposition, the actual angle of inclination is measured to be 48°.

The Second Embodiment

Firstly, a part with a cantilever structure is placed in the three-dimensional model processing software according to the predetermined forming position.

The allowance addition processing is performed on the part, where an allowance of a half spot is added to each single side. The cantilever structure of the part is identified according to the placing position, an inclined supporting portion for the cantilever structure is designed by the three-dimensional modelling UG software, the inclined surface corresponding to the inclined support is design, and the angle of inclination of the inclined surface to the plane perpendicular to the deposition direction is 51.8°, with a −1.8 mm allowance added to the angle of inclination, that is, the angle of inclination of the inclined surface of the inclined support model to the plane perpendicular to the deposition direction is 50°.

The layer separating and slicing process is performed on the part by a two-dimensional cutting software, the corresponding sides of the inclined surface in a two-dimensional cutting layer are identified, path planning are performed in each layer.

The third process parameters for preparation for the inner filling are set, comprising: laser power P=2800 W, scanning rate of the inner filling of 1000 mm/min, powder feeding rate of 20-22 g/min, spot diameter of 5 mm, layer thickness of 0.8 mm.

The first process parameters for preparation for the first path are set, comprising: laser power P=2800 W, scanning rate of the inner frame of 800 mm/min, powder feeding rate of 20-22 g/min, spot diameter of 5 mm, layer thickness of 0.8 mm.

The second process parameters for preparation for the second path are set, comprising: laser power P=2800 W, scanning rate of the outer frame of 50%*800=400 mm/min, powder feeding rate of 20-22 g/min, spot diameter of 5 mm, layer thickness of 0.8 mm.

Extending path b=3 mm, overlapping displacement c=0.8 mm are set.

The forming of the current layer is completed according to a planned forming strategy and process parameters, after the layer is formed, the next layer is inner filled by rotating 90° counterclockwise, without changing a laser scanning strategy of the scanning path of the first path 121 and the second path 122 in the frame scanning path 12, and keep repeating until the formation of the angle of inclination of the part is completed.

FIG. 8 shows a cross section view of the inclined supporting portion formed by laser melting deposition, the actual angle of inclination is measured to be 51.8°.

Although the present invention is disclosed above with the preferred embodiments, it is not intended to limit the disclosure, and any person skilled in the art can make possible changes and modifications without departing from the spirit and scope of the disclosure. Therefore, any modifications, equivalent changes and alternatives made to the above embodiments according to the technical essence of the disclosure without departing from the content of the technical solutions of the disclosure shall all fall within the scope of protection defined by the claims of the disclosure.

The invention claimed is:

1. A method for forming a forming part with a cantilever structure, used for forming the forming part with the cantilever structure, the cantilever structure is perpendicular to a laser melting deposition direction of the forming part and a lower portion is in a suspended state;

wherein the forming method comprises:

obtaining a model of the forming part, the model comprises a main body and at least one cantilever structure protruding from the main body;

adding at least one inclined supporting portion to the model, wherein a top of the inclined supporting portion is integrally connected to the cantilever structure, and a side of the inclined supporting portion is integrally connected to the main body, so that the lower portion of the cantilever structure in the suspended state is entirely supported by the at least one inclined supporting portion, the inclined supporting portion is provided with at least one inclined surface, the inclined surface is oriented downward and is provided with an angle of inclination, and the angle of inclination is an acute angle between the inclined surface and a forming base plate;

performing layer separating and slicing process on the model with said at least one inclined supporting portion along a direction perpendicular to a deposition direction, forming a plurality of forming layers;

performing scanning path planning on each forming layer, the scanning path after planning comprises an inner filling scanning path and a frame scanning path located on an outer periphery of the inner filling scanning path;

wherein in a plurality of forming layers forming the inclined surface, at least one layer to be formed has a suspended area protruding from a layer already formed and a non-suspended aera, the frame scanning path comprises a first path and a second path, the first path corresponds to the non-suspended area and the second path corresponds to the suspended area;

based on size of the angle of inclination, setting first process parameters for preparation for the first path, and setting second process parameters for preparation for the second path;

using laser melting deposition technique, printing layer by layer based on the set process parameters for preparation to form the forming part with the cantilever structure;

wherein an energy density in the first process parameters for preparation is smaller than an energy density in the second process parameters for preparation.

2. The method for forming the forming part with the cantilever structure according to claim 1, wherein the forming method further comprising:

setting third process parameters for preparation for the inner filling scanning path;

wherein an energy density in the third process parameters for preparation is smaller than the energy density in the first process parameters for preparation.

3. The method for forming the forming part with the cantilever structure according to claim 1, wherein the different energy density is obtained by adjusting laser power and/or scanning rate in the process parameters for preparation.

4. The method for forming the forming part with the cantilever structure according to claim 1, wherein the forming method further comprises:

performing support removing processing on the forming part to obtain a forming part with the cantilever structure.

5. The method for forming the forming part with the cantilever structure according to claim 1, wherein:

the first path and the second path are printed continuously during the forming process.

6. The method for forming the forming part with the cantilever structure according to claim 1, wherein:

a 90° angle is provided between the inner filling scanning path in two adjacent forming layers.

7. The method for forming the forming part with the cantilever structure according to claim 1, wherein the scanning path planning further comprising:

planning an extending path of the second path that extends along the first path;

planning a displacement between the second path and the inner filling scanning path;

wherein the second process parameters for preparation are set for the extending path.

8. The method for forming the forming part with the cantilever structure according to claim 1, wherein the scanning path planning further comprising:

planning an offset displacement of the second path towards the inner filling scanning path.

9. The method for forming the forming part with the cantilever structure according to claim 1, wherein before performing the layer separating and slicing process on the model, the forming method further comprising:

performing allowance addition processing on the model.

10. The method for forming the forming part with the cantilever structure according to claim 1, wherein the inclined supporting portion is with a shape of reversed pyramid.

* * * * *